Figure 1:
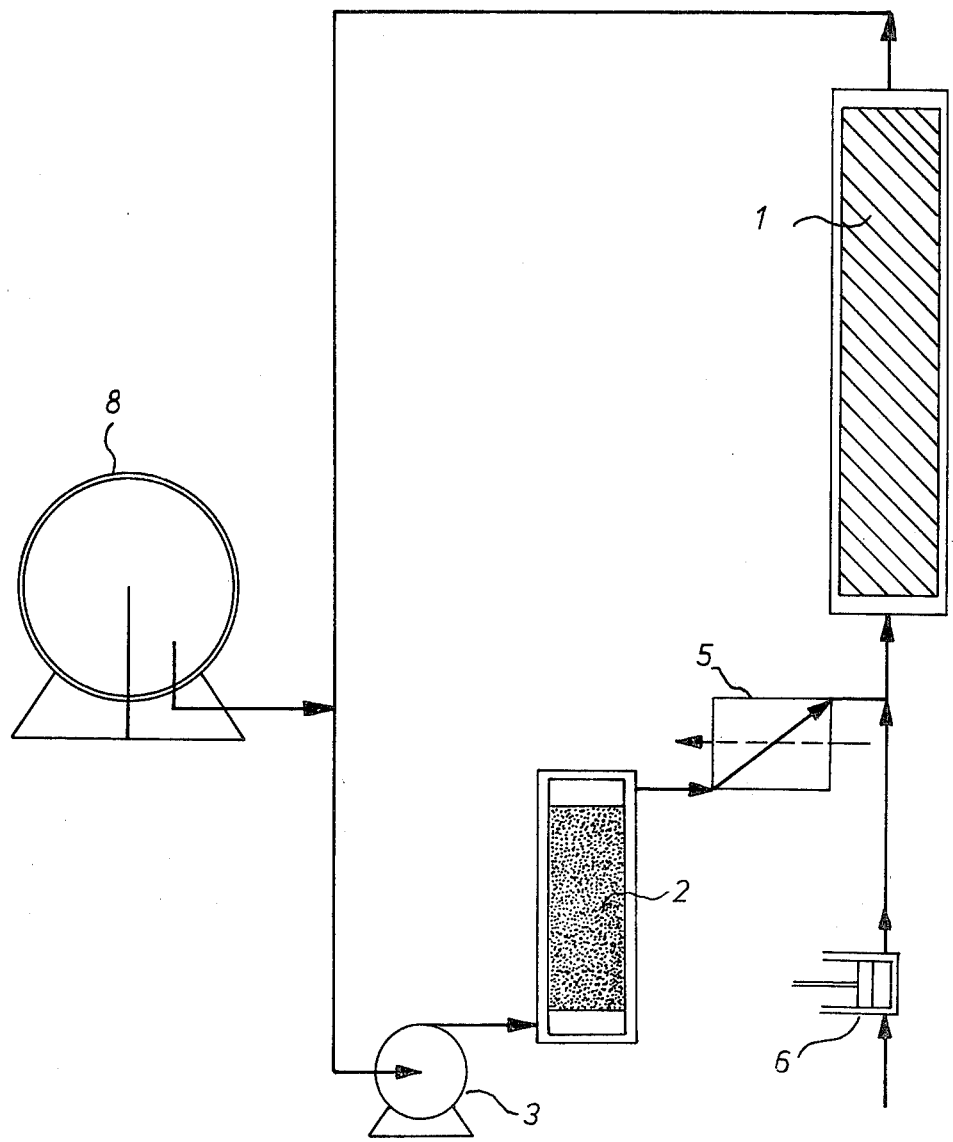

United States Patent [19]

Roselius et al.

[11] 4,168,324

[45] Sep. 18, 1979

[54] PROCESS OF EXTRACTING STIMULANTS FROM COFFEE

[75] Inventors: Ludwig Roselius, Bremen; Hans-Albert Kurzhals, Heissenbüttel; Klaus F. Sylla, Bremen; Peter Hubert, Bremen-Lesum, all of Fed. Rep. of Germany

[73] Assignee: HAG Aktiengesellschaft, Fed. Rep. of Germany

[21] Appl. No.: 772,365

[22] Filed: Feb. 25, 1977

[30] Foreign Application Priority Data

Aug. 30, 1976 [DE] Fed. Rep. of Germany ....... 2639066

[51] Int. Cl.² ............................................... A23F 1/04
[52] U.S. Cl. ................................. 426/312; 426/318; 426/319; 426/478; 426/481
[58] Field of Search ............... 426/312, 318, 319, 478, 426/481

[56] References Cited

U.S. PATENT DOCUMENTS

| 3,806,619 | 4/1974 | Zosel | 426/478 |
| 3,843,824 | 10/1974 | Roselius | 426/478 X |

FOREIGN PATENT DOCUMENTS 1057911 2/1967 United Kingdom ..................... 426/478

*Primary Examiner*—Joseph M. Golian
*Attorney, Agent, or Firm*—Pollock, Vande Sande & Priddy

[57] ABSTRACT

A method of producing coffee low in undesired stimulants by removing coffee wax from unroasted coffee by the use of a supercritical fluid and absorbing the coffee wax in an absorbent precharged with pure caffeine.

18 Claims, 2 Drawing Figures

PROCESS OF EXTRACTING STIMULANTS FROM COFFEE

Apart from the stimulating effect of caffeine on heart activity, other ingredients of roasted coffee beans can have a harmful physiological effect on the gastrointestinal system.

These undesired stimulants are predominantly lipophile substances which appear in so-called coffee wax and coffee oil [cf. W. Kiekebusch et al, *Arzneimittelforschung*, vol. 14. (1964), p. 1249; G. Czok et al, *Arzneimittelforschung*, vol. 12 (1962), p. 1195; U. Harms et al, *Zeitschrift für Lebensmitteluntersuchung und -forschung*, vol. 138 (1968), p. 75; U. Harms et al, KTM, vol. 19 (1969), No. 6, pp. 6-9, No. 7, pp. 6-9] and are partially carried over into the coffee during ordinary brewing.

It is known that the digestibility of coffee can be significantly improved by removing the coffee wax ingredients from raw coffee [S. Gal: *Lebensmittel und Ernährung* 27, pp. 218-220, 235-237 (1974)].

Carboxylic acid-5-hydroxytryptamides (C-5-HT) found in coffee wax serve as indicators of successful removal of these substances which form so-called roasting stimulants after roasting [J. Wurziger, 5. ASIC Colloquium, Lisbon (1971) "Carboxylic Acid Hydroxytryptamides for Evaluation of Fresh and Processed Coffee"].

In 1973 the Federal Health Office in Berne decided to classify any coffee demonstrably having a C-5-HT content of less than 400 ppm as a weak stimulant. With the decrease of C-5-HT content, the digestibility of coffee increases.

It is therefore the object of the present invention to produce a coffee low in undesired stimulants and to stay as far as possible below the aforementioned limit without altering the caffeine content of the raw coffee.

German Pat. No. 576,515 discloses a refining process in which raw beans are treated with pressurized steam. This is intended to improve the flavor and digestibility. In the refining method of German Published Application No. 1,692,284, stimulants are extracted from raw beans by a one minute treatment with liquid $CO_2$. However, these processes hardly remove any of the coffee wax constituents.

For this reason, later processes, e.g., those of German Published Applications Nos. 1,960,694 and 2,031,830, turned to treatment with organic solvents. The raw coffee beans are washed directly with methylene chloride, 1, 2-dichloroethane or trichloroethylene while being heated, without prior decomposition by water or steam. After evaporation of the solvent the beans are dried. By this process C-5-HT values between 90 to 230 ppm are obtained.

Most recently, the coffee industry has preferred processes which employ no liquid organic solvents, e.g., the quantitative extraction of caffeine from raw beans with the aid of moist supercritical $CO_2$ (German Pat. No. 2,005,293).

Surprisingly, it has now been discovered that coffee wax and the carboxylic acid-5-hydroxytryptamide contained therein can be successfully eliminated with the aid of supercritical gases, the coffee wax absorbed by the super-critical gas being continuously and selectively removed therefrom.

An object of the invention is a process for producing coffee low in roasting stimulants by removal of coffee wax from unroasted coffee beans while retaining the original caffeine content, the coffee beans being treated with a harmless solvent comprising supercritical fluid.

By "supercritical fluid" is meant a gas which is above its critical temperature and pressure.

The water content of the raw coffee can be set at 2 to 60% by an appropriate method of drying, steaming or spraying the preheated coffee beans with liquid water before removal of the undesired stimulants. The preferred moisture content is from 20 to 35%.

Gases or gas mixtures whose critical temperature is in the area of up to ca. 100° C., e.g., $CO_2$, $SF_6$, $N_2O$ and, optionally, halogen-containing hydrocarbons with 1 to 4 carbon atoms, e.g., $CHF_3$, $CHF_2Cl$, $CF_3Cl$, $CF_2=CH_2$, $C_3F_8$, $C_2H_6$, $C_3H_8$, $C_2H_4$, and $C_3H_6$ can be used for producing the supercritical fluid.

According to a further feature of the invention, an entrainer can be added. Since the solubility of the wax in the supercritical fluid is relatively low, its solubility in the circulating supercritical fluid can be enhanced by the addition of an entrainer. Entrainers alter the steam pressure and consequently the dispersion conditions of low volatility substances in the circulating fluid phases by increasing the separation factor in a favorable way (German Published Application No. 2,340,566), so that under the existing steam pressure conditions the coffee wax is removed more rapidly from the raw coffee.

According to the invention the entrainer or entrainer mixture must be so chosen that the selectivity of the circulating supercritical fluid for the coffee wax is increased as much as possible and is dependent on the selected separation pressure and the temperature. Its concentration depends on its miscibility.

If the mutual miscibility with the circulating supercritical fluid phase is incomplete, the concentration corresponds maximally to the saturation; if it is complete, the concentration amounts to 0.001 to 10% by weight. The entrainer can be introduced into the cycle at any desired point, with the aid of a dosing pump (6 in FIG. 1), or by impregnating the adsorbent with the entrainer or by bubbling the supercritical fluid through an entrainer supply.

Natural constituents of raw and roasted coffee are especially suitable as entrainers, e.g., alcohols (methanol, ethanol), ethers (diethyl ether), ketones (acetone, butanone-2), esters (ethyl acetate and ethyl formate), as well as halocarbons (methylene chloride, trichloromonofluoromethane), aromatics (toluene) and aliphatic compounds (n-hexane).

A particular advantage of this process is the fact that the entrainer residues are already removed during removal of the coffee from the supercritical fluid to such an extent that subsequent evaporation of the dewaxed raw coffee beans can be either omitted or, as opposed to prior processes, significantly abridged. Drying can be carried out in the customary manner in a drum dryer or other drying apparatus.

The working temperature of the process is above the critical temperature of the gas or gas mixture used, e.g., up to 150° C. above the critical temperature, preferably between 40° to 100° C. above the critical value.

The working pressure of the process depends on the desired processing time and can be between the extremes of 20 to 800 bar, these limits being chosen for practical reasons.

The speed of flow, and with it the circulating volume of the supercritical fluid, depends on other parameters of the process, such as pressure, temperature, kind of supercritical fluid, entrainer and adsorbent as well as processing time, which can run from 0.5 to 50 hours.

The carboxylic acid-5-hydroxytryptamide and the coffee wax can be removed from the circulating supercritical fluid with the help of an adsorbent pre-charged with caffeine (see FIG. 1). All known sorption agents, especially active carbon, can be considered for the adsorption of separated wax particles from the circulating supercritical fluid.

Pre-charging of the sorption agent with caffeine is preferably attained by contacting the sorption agent with an aqueous pure caffeine solution at a temperature of 20 to 150° C. and a pressure of 1 to 10 bar. The contact can occur, e.g., in a stirrer or by passing the aqueous pure caffeine solution through an amount of sorption agent. Finally, the sorption agent is dried by a known drying process until the desired final water content is obtained.

The caffeine content of the pre-charged sorption agent is to be so selected that a dynamic equilibrium of caffeine concentrations results between raw coffee, supercritical phase and sorption agent, so that the caffeine content of the raw coffee remains unchanged.

The water content of the pre-charged sorption agent is to be so selected that the water content of the moist raw coffee does not go below a predetermined minimum during processing, so that there is no change in the bulk weight of the coffee beans during removal of the raw coffee from the supercritical phase. The preferred minimum water content is above 15% by weight.

According to the invention, the mass ratio of the raw coffee and the sorption agent must be so selected that all the removed stimulants are completely adsorbed.

The separation of the wax constituents and the C-5-HT contained therein from the sorption agent can be carried out according to well-known methods of sorption agent regeneration, preferably with an organic solvent, with subsequent removal of the residual solvent by evaporation and drying.

Instead of adsorption of the wax particles and contained C-5-HT dissolved in the supercritical fluid, these substances can also be separated by altering the pressure and/or temperature. This variant process (see FIG. 2) requires a supercritical fluid with a particularly high degree of selectivity for coffee waxes in order to avoid a concurrent drop in the caffeine and water contents of the raw coffee beans.

As an alternative, balance in caffeine content can also be achieved by introducing a caffeine solution into the circulating supercritical fluid, e.g., with a dosing pump (6 in FIG. 2), thereby avoiding any change in the caffeine content of the raw coffee beans.

The process according to the invention produces a coffee low in undesired stimulants whose C-5-HT content can be diminished to below 200 ppm while its initial caffeine content remains unchanged. The process can be so carried out that the raw coffee beans, low in stimulants, contain no traces of solvent and, without subsequent steaming, can immediately be dried in the drum in the customary way. Subsequently, the beans can be roasted in the usual way. The result is a roasted coffee whose appearance and taste are indistinguishable from the finest natural mild blends.

FIG. 1 shows an apparatus for continuous removal of undesired stimulants from raw coffee by means of a supercritical fluid. Extractor 1 contains an amount of raw coffee beans whose water content is brought to a predetermined value before they enter the extractor.

The fluid is passed from storage vessel 8 into the extraction cycle. Circulating pump 3 maintains circulation of the fluid in the extraction cycle, which comprises the extractor 1, an adsorber 2 and a heater 5. The adsorber contains an adsorbent pre-charged with pure caffeine and/or entrainer. The heater 5 heats the circulating fluid to the processing temperature which is above the critical temperature of the fluid.

Dosing pump 6 serves for introducing the entrainer and/or caffeine solution into the cycle. After heating, the supercritical fluid continuously flow through extractor 1 where it becomes charged with the coffee wax and C-5-HT contained therein. In turn, these substances are removed from the circulating fluid in adsorber 2. By suitable pre-charging of the adsorbent with pure caffeine, or by dosing of a sufficient amount of caffeine solution through dosing pump 6, the caffeine and water contents of the supercritical fluid flowing to extractor 1 are always set in such a way that the extractor removes no caffeine or water, but only coffee wax, from the raw coffee beans.

Figure 2:
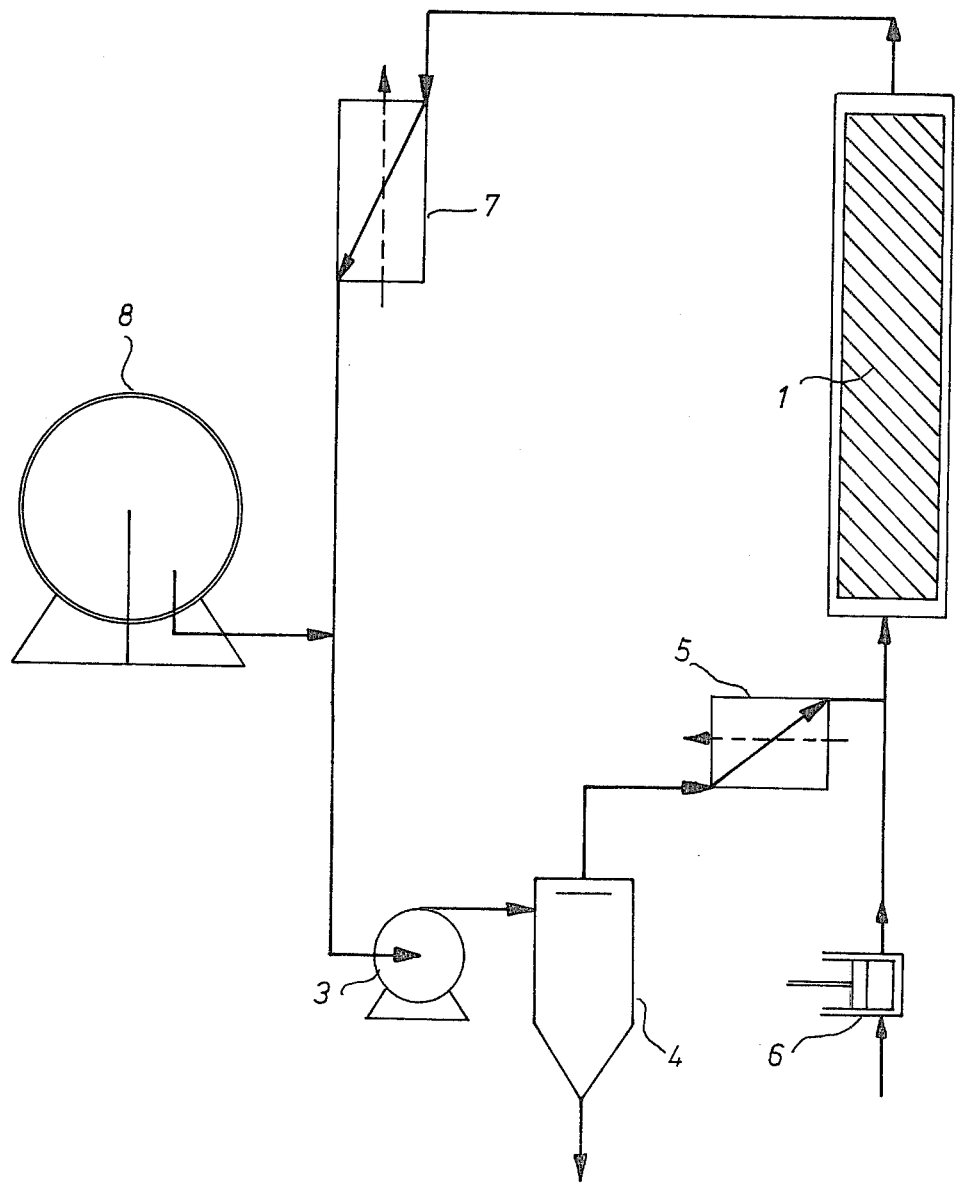

Another possible way of separating coffee wax from the circulating supercritical fluid is shown in FIG. 2. This method is characterized by cooling the supercritical fluid below its critical temperature in cooler 7 after it leaves extractor 1. This alters its dissolving characteristics so that a separate phase comprising a mixture of coffee wax, caffeine and water forms in the subcritical fluid and can be separated therefrom in a separator 4. If an entrainer is used, this also will be removed in separator 4. After reheating the fluid to supercritical temperature in the heater 5, enough caffeine solution is injected into the fluid by dosing pump 6 to ensure the same caffeine, water and entrainer contents of the fluid flowing to extractor 1 as before separation of the coffee wax. Subsequently, the extractor removes only coffee wax from the raw beans, not caffeine and water.

The process is illustrated by means of the following examples and accompanying drawings.

EXAMPLE 1

In an apparatus according to FIG. 1, 30 kg raw coffee having a moisture content of 33% by weight was processed for 4 hours at 80° C. and under 250 bar pressure with moist supercritical $CO_2$, the moist raw coffee being present as a solid mass in extractor 1. Active carbon, charged with aqueous, saturated caffeine solution, was used as adsorbent and was brought to a water content of 16% by weight by subsequent drying. The adsorbent was present in adsorber 2 as a solid mass. After filling the system with $CO_2$ from the storage vessel 8, the $CO_2$ was circulated by circulating pump 3 and heated to the desired supercritical temperature in heater 5. The filling amount of $CO_2$ was so chosen as to ensure the desired pressure after heating of the $CO_2$. The circulating mass stream of supercritical $CO_2$ weighed 150 times as much as the raw coffee. The processed raw coffee was dried in a vacuum drum dryer at 75° C. and 0.2 bar pressure. Finally, the coffee was roasted in a conventional drum roaster.

The analytical results after drying and roasting are shown in Table 1.

TABLE 1

| | Analytical Results for Example 1 | |
| --- | --- | --- |
| | Roasted Coffee | |
| Material | Unprocessed | Processed |
| C-5-HT, ppm | 580 | 160 |

TABLE 1-continued

Analytical Results for Example 1

| Material | Roasted Coffee | |
|---|---|---|
| | Unprocessed | Processed |
| caffeine, % | 1.11 | 1.18 |
| water soluble substances, % | 26.4 | 26.7 |

EXAMPLE 2

In an apparatus according to FIG. 1, 30 kg raw coffee with moisture content of 10.5% was processed for 6 hours at 70° C. and under 300 bar pressure with dry supercritical $CO_2$. The raw coffee was present in extractor 1, and active carbon, previously impregnated with 2.4% by weight acetone, was used as adsorbent in adsorber 2. After filling the apparatus with $CO_2$, the gas was circulated and brought to the aforementioned supercritical conditions. After processing, the $CO_2$ was removed from the system in such manner that no change occurred in the bulk weight of the raw coffee. The coffee was roasted immediately after removal.

TABLE 2

Analytical Results for Example 2

| Material | Roasted Coffee | |
|---|---|---|
| | Unprocessed | Processed |
| C-5-HT, ppm | 640 | 130 |
| caffeine, % | 1.14 | 1.16 |
| water soluble substances, % | 26.3 | 26.7 |

EXAMPLE 3

In an apparatus according to FIG. 2, 30 kg raw coffee with a moisture content of 45% by weight was processed for 8 hours at 90° C. and under 200 bar pressure with moist supercritical $CO_2$, the moist raw coffee being present in extractor 1. The circulating $CO_2$ was cooled from 90° C. to 25° C. in cooler 7 and thereby liquefied. A mixture of coffee wax, caffeine, and water was continuously obtained as a separate phase in separator 4 from the liquid $CO_2$ and withdrawn from the separator. An aqueous caffeine solution, whose amount and caffeine content corresponded to the water and caffeine amount removed in separator 4, was continuously added by means of dosing pump 6 to the supercritical fluid heated in heater 5 to the supercritical temperature 90° C. Drying and roasting followed as in Example 1. The analytical results obtained after roasting are shown in Table 3.

TABLE 3

Analytical Results for Example 3

| Material | Roasted Coffee | |
|---|---|---|
| | Unprocessed | Processed |
| C-5-HT, ppm | 620 | 175 |
| caffeine, % | 1.42 | 1.45 |
| water soluble substances, % | 26.5 | 26.1 |

What is claimed is:

1. Process for the production of coffee low in undesired stimulants normally produced during roasting while retaining the original caffeine content which comprises removing coffee wax from unroasted coffee beans by treating said beans with a solvent harmless to health, said solvent comprising a supercritical fluid, and adsorbing said coffee wax by means of an adsorbent which is precharged with pure caffeine.

2. Process according to claim 1, wherein the working pressure used is 20 to 800 bar.

3. Process according to claim 1, wherein the moisture content of the raw coffee is between 2 to 60% by weight.

4. Process according to claim 3, wherein the moisture content of the raw coffee is 20 to 35% by weight.

5. Process according to claim 1, wherein said solvent is a gas or gas mixture which is harmless to health, and whose critical temperature is below 100° C.

6. Process according to claim 5, wherein said solvent is $CO_2$.

7. Process according to claim 1, including the step of adding an entrainer to the gas.

8. Process according to claim 7, wherein the entrainer comprises ingredients of raw and roasted coffee.

9. Process according to claim 1, wherein said adsorbent is active carbon.

10. The process of claim 1 wherein said treating with solvent is carried out at a temperature of up to 150° C. above the critical temperature of said solvent.

11. The process of claim 1 wherein said temperature is 40° to 100° C. above said critical temperature.

12. The process of claim 1 wherein said adsorbent is precharged by contacting said adsorbent with an aqueous pure caffeine solution at a temperature of 20° to 150° C. and a pressure of 1 to 10 bar.

13. The process of claim 1 wherein the water content of the precharged adsorption agent is selected so that the water content of the unroasted coffee beans does not go below a predetermined minimum during said process.

14. The process of claim 13 wherein said predetermined minimum is above 15% by weight.

15. The process of claim 1 wherein said supercritical fluid is selected from the group consisting of $CO_2$, $SF_6$, $N_2O$, $CHF_3$, $CHF_2Cl$, $CF_3Cl$, $CF_2=CH_2$, $C_3F_8$, $C_2H_6$, $C_3H_8$, $C_2H_4$, $C_3H_6$, and mixtures thereof.

16. The process of claim 7 wherein said entrainer is selected from the group consisting of alcohols, ethers, ketones, esters, halocarbons, aromatic compounds, aliphatic compounds, and mixtures thereof.

17. The process of claim 7 wherein said entrainer is selected from the group consisting of methanol, ethanol, diethyl ether, acetone, butanone-2, ethyl acetate, ethyl formate, methylene chloride, trichloromonofluoromethane, toluene, N-hexane, and mixtures thereof.

18. The process of claim 1 wherein the coffee produced has less than 200 ppm of carboxylic acid-5-hydroxytryptamide (C-5-HT).

* * * * *